UNITED STATES PATENT OFFICE.

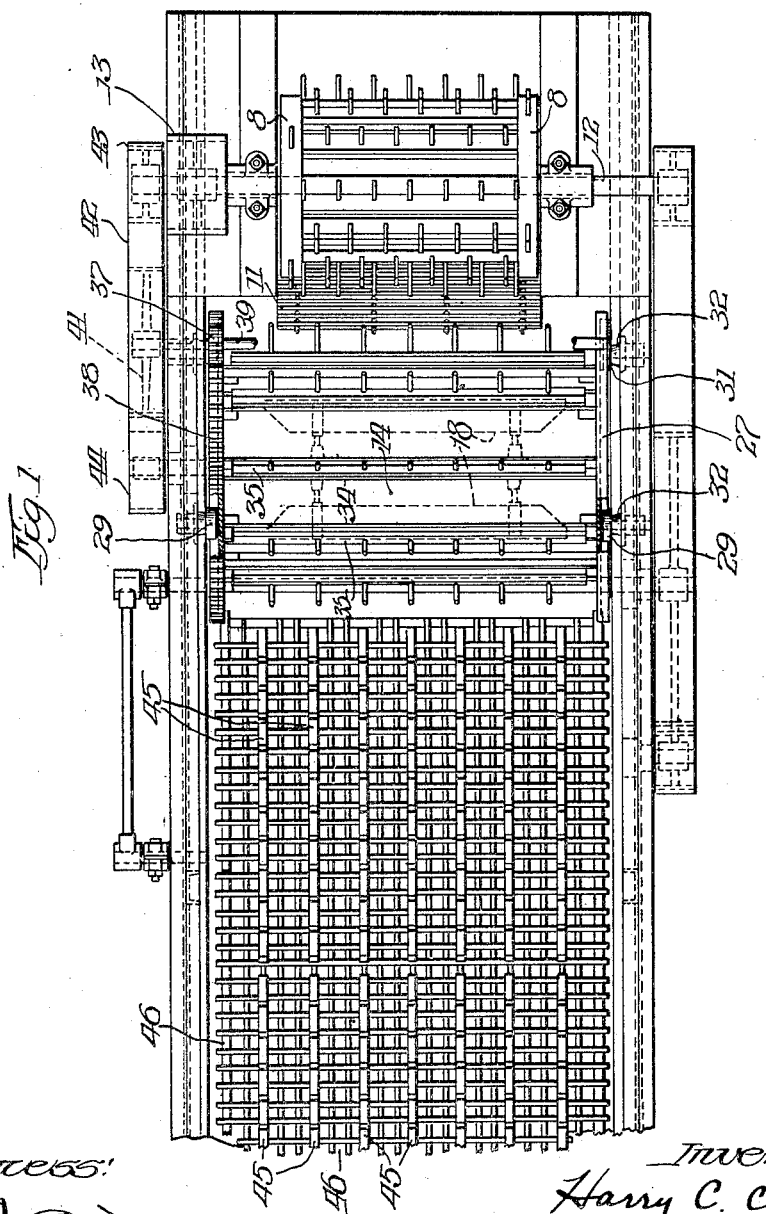

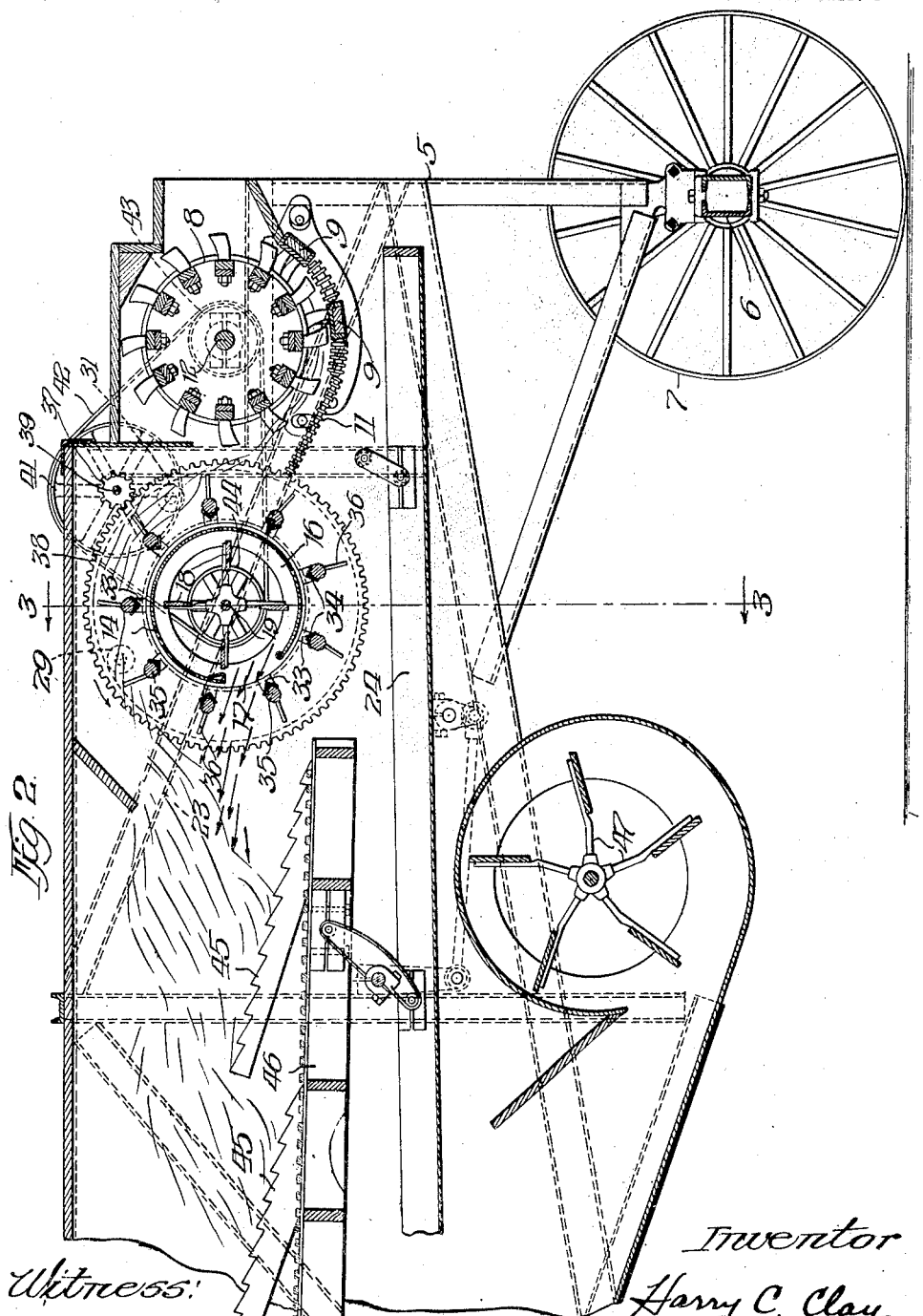

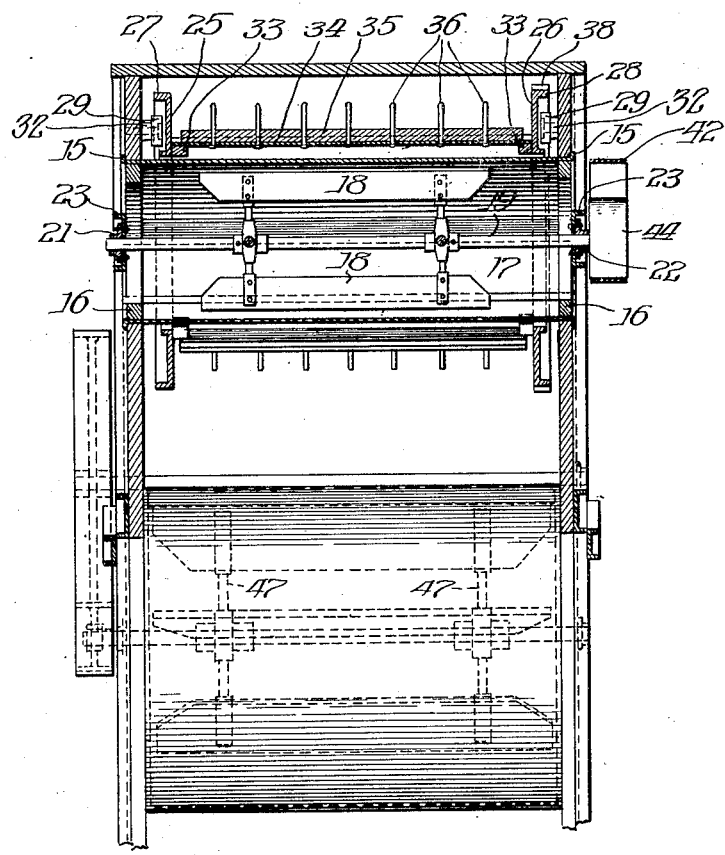

HARRY C. CLAY, OF COLUMBUS, INDIANA, ASSIGNOR TO EMERSON-BRANTINGHAM COMPANY, OF ROCKFORD, ILLINOIS, A CORPORATION OF ILLINOIS.

SEPARATOR.

1,357,275.　　　　Specification of Letters Patent.　　Patented Nov. 2, 1920.

Application filed February 19, 1917. Serial No. 149,492.

*To all whom it may concern:*

Be it known that I, HARRY C. CLAY, a citizen of the United States, residing at Columbus, in the county of Bartholomew and State of Indiana, have invented certain new and useful Improvements in Separators, of which the following is a specification.

Grain separators, as they are now customarily built, comprise various mechanisms rearwardly of the threshing cylinder for separating the grain from the chaff and straw. These mechanisms include revolving beaters, reciprocating straw racks, shaking fingers and various devices, all designed to thoroughly shake out and separate the kernels of grain. As the inevitable result of these various mechanisms the separators are unduly long from end to end, making them very expensive to manufacture and also very cumbersome to ship and inconvenient to transport from place to place in use.

One of the primary objects of my present invention is to provide a separator which will thoroughly and effectively separate the grain from the straw and chaff, but which will be considerably shorter than it has heretofore been possible to make a machine which would perform the same amount of work.

With this end in view I have designed a separator in which the work of a number of revolving beaters, shaker fingers and straw racks is accomplished by an air blast delivered against the straw and grain shortly after they leave the threshing cylinder. This air blast is delivered with such force and at such an angle to the traveling material that the long straw and the chaff are lifted and carried rearwardly by the blast while the kernels of grain are separated from the straw and the chaff and are permitted to drop down upon the underlying grain pan. The result is that a very large proportion of the grain is separated by the action of this air blast in a very short space of travel through the machine, and, consequently, the machine can be built much shorter in length than the machines which require a relatively large amount of mechanism to accomplish the same work.

Another object of my invention is to provide a separator which will be not only efficient and durable in operation but will also be simple in construction and cheap to manufacture and which will not be liable to get out of order or require much attention when in operation.

With these general objects in view my invention should be readily understood by reference to the following description when considered in connection with the accompanying drawings, upon which one preferred embodiment of the invention is illustrated. Referring to the drawings,—

Figure 1 is a fragmentary plan view, with the top removed, of a separator embodying my invention;

Fig. 2 is a longitudinal sectional view; and

Fig. 3 is a transverse sectional view on the line 3—3 of Fig. 2.

Referring now to the drawings, in which only the forward end of a separator is shown, it will be observed that the separator frame, indicated generally by reference character 5, is built up of frame members and brace members arranged in the usual or any preferred manner and securely fastened together to provide a frame of the requisite strength and rigidity. The forward axle 6 is carried by the usual wheels 7 and the cylinder 8, provided with the usual teeth, runs in coöperative relation to the concaves 9 and grates 11, as is customary in these machines. The cylinder shaft 12 is provided with the usual pulley 13 through which the separator receives its power from a belt driven usually by a steam or gas engine.

Rearwardly of the cylinder 8 I have mounted a stationary cylindrical drum or fan casing 14 which extends from one side to the other of the separator, the drum ends being preferable flanged outwardly as indicated at 15 and rigidly secured to the margin of the openings in the side walls of the separator, through which the ends of the drum extend. Rings 16 are inserted in the ends of the drum into alinement with the side walls of the separator so that they assist in holding the drum in position and also cut down to some extent the area of the openings into the ends of the drum. It will be observed from Figs. 2 and 3 that the rear wall of the drum is provided, preferably below the center, with an opening 17 which extends throughout the full length of the drum and affords an elongated port or passage through which an air blast is delivered in a rearward and upward direction by the blades 18 of a revolving fan fixedly mounted upon a shaft 19 which is journaled at its opposite ends in bearing boxes 21 and 22 fixedly carried by diagonal channel-shaped braces 23 forming part of the machine frame.

It will be manifest that the drum 14 is disposed in the path of the material which leaves the cylinder 8 and some of the kernels of grain which have been removed from the straw and chaff by the cylinder will strike the drum and drop immediately from the front side of the drum down upon the reciprocating grain bottom or pan 24. The straw, chaff, and a large proportion of the grain, however, will be carried upwardly over the drum 14 by a conveyer or carrier, which will now be described.

The conveyer or carrier, which I have shown in the present instance for the purpose of illustrating one practical embodiment of my invention, consists primarily of a pair of flanged wheels 25 and 26 provided with outwardly extending flanges 27 and 28, respectively, which rest upon and are supported by rollers 29 and 31 rotatably carried upon inwardly extending studs or brackets 32 fixedly mounted upon the sides of the machine. These rollers provide a support upon which the wheels 25 and 26 may revolve around the drum 14 and concentric therewith. The inner faces of the wheels 25 and 26 are provided with inwardly extending V-shaped shoulders 33 spaced at regular intervals circumferentially of the wheels in proximity to the drum, the corresponding shoulders on the two wheels being rigidly connected by angle bars 34 made of metal of suitable weight and firmly bolted to the shoulders 33. Each angle bar 34 receives and carries a wooden bar 35 and from the outer faces of these bars project a series of spikes or pins 36, these spikes being inserted through openings in the bars 34 and driven through the wooden bars 35 so as to firmly unite and secure the wooden and metal bars together and firmly anchor the spikes which form radially projecting teeth around the drum 14 and between the wheels 25 and 26. It will be obvious therefore that the wheels 25 and 26 are rigidly secured together so that they form in effect a circular cage surrounding the stationary drum 14, this cage having radially projecting teeth which will carry the material delivered from the cylinder 8 upwardly and over the drum 14 as the cage is rotated in a counterclockwise direction, viewing Fig. 2.

The cage is driven in the direction indicated by a pinion 37 meshing with gear teeth 38 formed on the periphery of the wheel 26. The pinion is mounted upon a shaft 39, the outer end of which is equipped with a pulley 41 which in turn is driven in a clockwise direction by a belt 42 trained over a driving pulley 43 on the cylinder shaft 12 and over a driven pulley 44 on the blower shaft 19.

As the result of the reduction in speed afforded by the relative sizes of the pulleys 41 and 43 and the relative sizes of the pinion 37 and the wheel 36 the carrier or conveyer will travel at relatively slow speed. As the material is delivered from the cylinder 8 it will be picked up by the projecting teeth 36 on the revolving conveyer and carried upwardly and over the drum 14 and delivered at the rear side of the drum.

The upwardly and rearwardly directed air blast issuing from the opening 17 in the drum 14 from the rapidly rotating fan blower within the drum will strike the material which has been conveyed over the drum and the straw and chaff will be lifted and blown upwardly and rearwardly while the heavier kernels of grain will separate by gravity from the straw and chaff and fall upon the grain pan or bottom 24. This simple air blast performs most effectually all of the functions and attributes of the numerous beaters, shakers and the like customarily employed for separating the grain from the straw.

Such grain as may be unseparated from the straw and chaff is shaken out in the usual manner by the reciprocating straw racks 45 and the chaffer 46, and the grain as it falls off the rear end of the grain pan 24 is subjected to a cleaning blast of air from the usual fan 47. The mechanism by which the straw racks, the chaffer and the grain pan are reciprocated back and forth longitudinally of the machine may be of any well known or preferred construction, and since no claim is made to any particular mechanism for operating these parts a complete showing and description of them is believed to be unnecessary.

I am, however, so far as I am aware, the first to position a stationary drum and a revoluble conveyer or carrier in the coöperative relation described above, and support these elements independently in such manner that the ends of the drum are sealed from the interior of the separator compartment and the carrier is supported independently of the drum, whereby various important and practical advantages are obtained, and I desire it to be understood therefore that my invention is not restricted to the details of construction illustrated and described but is capable of embodiment in materially different structures without departing from the essence of my invention as defined in the following claims.

I claim:

1. In a separator, the combination of a separator frame having side walls provided with laterally alined circular openings; a stationary cylindrical drum of the character described, the ends of which project into and are seated in said openings in the side walls, the drum having an opening through which a blast of air may be delivered, a traveling carrier movable about the drum for delivering material into the path of said blast of air, and means beyond the periphery of the drum and independent thereof for revolubly supporting the carrier.

2. In a separator, the combination of a separator frame having side walls, a stationary drum having an imperforate peripheral wall except for an opening through which a blast of air may be delivered, the ends of the drum being fixedly secured to the side walls of the frame whereby the drum is directly supported from said side walls and the ends of the drum are effectually sealed against the entrance thereto of grain, chaff, etc., from the interior of the separator, a conveyer or carrier revoluble about the drum for delivering material over the drum and into said blast of air, and means beyond the periphery of the drum and independent thereof for revolubly supporting the carrier.

3. In a separator, the combination of a separator compartment, a fan casing or drum within the compartment and closed thereto except for a longitudinally extending air delivery opening in the peripheral wall of the drum, means communicating the interior of the drum with the exterior of the separator compartment for an air supply, a fan within the casing for delivering a blast of air outwardly through said opening, a rotary carrier substantially co-extensive of and revoluble about but unsupported from the fan casing, and means for revolving the carrier.

4. In a separator, the combination of a separator frame including side walls having openings in lateral alinement, a fan casing in the form of a drum secured at its ends to the side walls and registering with said openings and being imperforate intermediate said walls except for a longitudinally extending air discharge opening at the periphery of the drum, means for delivering a blast of air from within the drum outwardly through said openings, a carrier revoluble about the fan casing, means supporting the carrier independently of the drum, and means for revolving the carrier on said supporting means.

5. In a separator, the combination of a separator frame having side walls with laterally alined air openings, a fan casing or drum registering at its ends with said openings and so secured to the walls as to provide a closed casing between said walls except for a longitudinally extending air delivery opening at the periphery of the drum, a fan in the casing for delivering a blast of air outwardly through said opening, a carrier circumscribing the drum, rollers beyond the periphery of the drum and supported from the side walls and upon which the carrier is revolubly mounted, and means for revolving the carrier on said rollers.

6. In a separator, the combination of a separator frame having side walls provided with laterally alined circular openings, a stationary cylindrical drum extending from one side wall to the other and having its ends secured in said openings in the side walls and having a longitudinally extending opening in its peripheral walls through which an air blast may be delivered outwardly from the drum, a carrier adapted to revolve about the drum unsupported thereby, and means beyond the peripheral wall of the drum for supporting the carrier at both ends directly from the side walls of the separator frame and upon which means the carrier is revoluble, whereby the stationary drum and revoluble carrier are respectively, independently mounted upon and carried by the side walls of the frame.

7. In a separator, the combination of a separator compartment having side walls, a stationary drum in the separator compartment having imperforate walls except for a longitudinally extending opening through which a blast of air may be delivered, the ends of the drum being fixedly secured to the side walls of the compartment whereby the drum is directly supported from said side walls and the ends of the drum are effectually sealed against the entrance thereto of grain, chaff, etc., from the interior of the separator compartment, a conveyer or carrier revoluble about the drum for delivering material over the same into said blast of air, the carrier including a flanged wheel at each end circumscribing the drum and unsupported thereby, and rollers supported from the side walls of the separator frame and disposed in coöperative relation with the flanged wheels, whereby the latter are directly supported by and revoluble on said rollers.

HARRY C. CLAY.